United States Patent Office 3,374,060
Patented Mar. 19, 1968

3,374,060
PRODUCTION OF MONOMERIC ISOCYANIC ACID
Günter Oertel, Cologne-Flittard, Hans Holtschmidt, Leverkusen, and Karl-Friedrich Zenner, Cologne-Flittard, Germany, assignors to Farbenfabriken Bayer Aktiengesellschaft, Leverkusen, Germany, a corporation of Germany
No Drawing. Filed Dec. 13, 1965, Ser. No. 513,589
10 Claims. (Cl. 23—151)

ABSTRACT OF THE DISCLOSURE

A process for producing monomeric, isocyanic acid by reacting hydrogen halide with an alkali, alkaline earth or ammonium cyanate in an inert organic solvent and under substantially anhydrous conditions. The process also optionally utilizes catalytic amounts of water or dimethylformamide.

---

Monomeric isocyanic acid can technically be produced according to two processes by pyrolysis of cyanuric acid or urea. Both processes are conducted at high temperatures and require expensive equipment. The monomeric isocyanic acid is obtained according to both processes in gaseous form and is contaminated with other pyrolysis products. Therefore, the gas evolved during pyrolysis has to be condensed at very low temperatures. In order to recover isocyanic acid in pure form, the condensation has to be followed by an expensive fractional distillation at low temperature which is hazardous in view of possible decomposition of impure isocyanic acid (cf. Zeitschrift für anorganische and allgemeine Chemie, 236 (1938), page 200).

It is an object of the present invention to provide a new and simple process for producing monomeric isocyanic acid in an organic solvent. It is another object of the present invention to overcome the drawbacks encountered in the previously known processes of producing monomeric isocyanic acid. Further objects will become apparent as the following description proceeds.

In accordance with the invention it has been found that solutions of monomeric isocyanic acid are obtained by suspending an alkali metal cyanate, an alkaline earth metal cyanate or ammonium cyanate in an inert organic solvent and reacting the suspensions with a hydrogen halide at temperatures of −50 to +200° C. under substantially anhydrous conditions.

Although the alkali metal cyanates, alkaline earth metal cyanates and ammonium cyanate are substantially insoluble in most organic solvents, the reaction with the hydrogen halide proceeds at high speed and produces monomeric isocyanic acid in high yields with the simultaneous formation of the corresponding alkali metal halide, alkaline earth metal halide and ammonium halide respectively. After the reaction the monomeric isocyanic acid is recovered in solution by merely separating off the inorganic salts, e.g. by filtration. The resulting solutions of isocyanic acid can immediately be used in organic synthesis so that isolation of the monomeric isocyanic acid is not required. Another advantage of the new process is that monomeric isocyanic acid is substantially more stable in solution than in pure form. This insures a particular technical advantage of the process according to the invention, viz. its simplicity, harmlessness and economy.

The reaction of the new process is extraordinarily surprising since according to "Liebig's Annalen der Chemie" 45, pages 357–359 (1843) the reaction occurring between potassium cyanate and hydrogen chloride does not produce monomeric isocyanic acid, but yields cyanuric acid as well as a reaction product of isocyanic acid and hydrogen chloride of the formula $NH_2COCl$. In "Liebig's Annalen der Chemie," 244, page 35 (1888) it was later confirmed that carbamic acid chloride results from hydrogen chloride and cyanic acid. Therefore, the formation of carbamic acid chloride and cyanuric acid had to be expected under the conditions of the process according to the invention.

Hydrogen halides which are useful in practicing the new process are in particular hydrogen chloride and hydrogen bromide. Suitable reaction media include all organic solvents containing no active hydrogen which can be determined by the Zerewitinoff method. In particular useful for the purpose of the invention are hydrocarbons which may be halogenated or nitrated, e.g. benzene, toluene, xylene, ligroin, chlorobenzene and trichloroethylene as well as ethers such as dimethylether and dioxane, as well as ketones such as acetone and diethylketone. Examples of suitable cyanates are in particular sodium cyanate, potassium cyanate, calcium cyanate, barium cyanate and ammonium cyanate.

The process according to the invention is carried out at temperatures of −50 to +200° C., preferably 20–100° C. The new process is in general accomplished by suspending an alkali metal cyanate, an alkaline earth metal cyanate or ammonium cyanate in one of the above-said solvents and adding to the suspension a solution of a hydrogen halide in one of the said solvents or introducing a gaseous hydrogen halide. The solution of the isocyanic acid can be isolated from the precipitated alkali metal halide, alkaline earth metal halide or ammonium halide by filtration. The quantities of the reactants are chosen so that the cyanate is present in excess, at least however, in equivalent quantities to the acid.

The process according to the invention proceeds in the absence of catalysts, however, the reaction velocity can be increased by the addition of catalytical amounts of substances which represent good solvents for cyanates. Suitable catalysts for the purpose of the invention are e.g. water or dimethyl-formamide in quantities of 0.001 to 0.5% by volume, preferably 0.01 to 0.1% by volume, referred to the total volume of the reaction mixture.

The isocyanic acid which is readily accessible according to the invention is especially suitable in the preparation of organic isocyanates as can be seen from Example 2b.

The invention is further illustrated by the following examples without being restricted thereto, the given parts being by weight, if not otherwise stated.

Example 1

65 parts of finely pulverized sodium cyanate are suspended in 200 parts by volume of acetone. 18.5 parts of hydrochloric acid gas are introduced into the suspension at 30 to 50° C. with cooling and vigorous stirring within 20 to 30 minutes. The gas introduced is absorbed at a high rate. After the exothermic reaction has subsided the suspension of excess sodium cyanate and the sodium chloride formed is stirred for a further 30 minutes at 30–40° C. The salts are then filtered off and washed with little acetone. The monomeric isocyanic acid is determined in the combined filtrates according to the usual method of NCO determination by reaction with an excess 1 n-dibutyl amine solution and re-titration with 1 n-hydrochloric acid. The gasometric determination of the carbon dioxide formed in the decomposition of the isocyanic acid with aqueous nitric acid as well as the nitrogen determination according to Kjeldahl are utilized to ascertain the yield. The combined filtrates contain 18.3 parts of monomeric isocyanic acid corresponding to a yield of 85% referred to the hydrogen chloride used. The crude solution can immediately be used in organic synthesis. The entire solution can be distilled under reduced pressure, if desired.

Example 2

(a) 40 parts of sodium cyanate are suspended in 150 parts by volume of benzene. 18.5 parts of gaseous hydrochloric acid are introduced into the suspension at 40–50° C. The vigorously proceeding reaction is moderated by cooling with ice-water. After introducing the hydrochloric acid gas, the reaction mixture is stirred at 30 to 40° C. for a further hour. The inorganic salts are then filtered off and the monomeric isocyanic acid in the filtrate is determined by the methods described in Example 1. The solution contains 18 parts of monomeric isocyanic acid corresponding to a yield of 84% of the theoretical.

When replacing in the above described reaction sodium-cyanate by the equivalent amount of potassium-, calcium-, barium or ammonium cyanate, monomeric isocyanic acid is likewise formed.

The resulting monomeric isocyanic acid is established by the known synthesis of n-butyl-α-isocyanate ethyl ether from n-butyl-vinyl ether:

(b) Preparation of

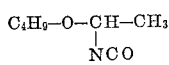

42 parts of n-butyl-vinyl ether are added dropwise at 30 to 50° C. to the solution obtained according to Example 2a: Upon the addition of 0.1 part of p-toluene sulfonic acid as catalyst a weakly exothermic reaction is observed. The reaction solution is stirred until the temperature begins to drop. The clear solution is then evaporated under reduced pressure and the residue distilled. 45 parts (74% of the theoretical) of n-butyl-α-isocyanate ethyl ether are obtained.

B.P.: 49 to 50° C. at 13 mm. Hg; $n_D^{20} = 1.4117$; NCO content calculated: 29.4%. Found: 29.6%.

Example 3

81 parts of finely pulverised potassium cyanate are suspended in 250 parts by volume of acetic acid ethyl ester. In order to accelerate the subsequent reaction with hydrochloric acid gas 0.1 part by volume of water is added to the suspension. Further to this, 36.5 parts of hydrochloric acid gas are introduced under cooling at a temperature of 30 to 50° C. during 20 to 30 minutes, while stirring vigorously. The hydrochloric acid gas reacts practically at once with the cyanate and is absorbed very quickly. After the exothermic reaction has subsided the suspension of potassium chloride formed in the acetic acid ethyl ester is stirred for a further 30 minutes at 40° C. The potassium chloride is separated by suction, washed with little acetic acid ethyl ester and the content of monomeric isocyanic acid is determined in the combined filtrates according to the method cited in Example 1. The combined filtrates contain 40.8 parts of monomeric isocyanic acid corresponding to a yield of 95% of the theoretical.

We claim:
1. Process of producing monomeric isocyanic acid which comprises reacting hydrogen halide selected from the group consisting of hydrogen chloride and hydrogen bromide, with a suspension of a cyanate selected from the group consisting of alkali cyanate, alkaline earth metal cyanate and ammonium cyanate, under substantially anhydrous conditions in an inert organic medium at a temperature of about −50 to +200° C., and recovering the resulting product.

2. Process of claim 1 wherein the reaction is effected in the presence of a member selected from the group consisting of water and dimethylformamide in an amount sufficient to catalyze the reaction.

3. Process of claim 1 comprising introducing about 18.5–36.5 parts of hydrogen chloride into a suspension of about 40–81 parts of cyanate in an inert organic medium, effecting the reaction at a temperature of about 30° C.–50° C.

4. The process of claim 1 wherein the reaction is effected in the presence of a catalytic amount of water.

5. Process of claim 1, wherein the cyanate is a member selected from the group consisting of sodium cyanate, potassium cyanate, calcium cyanate, barium cyanate and ammonium cyanate.

6. Process of claim 1, wherein the inert organic solvent is a member selected from the group consisting of benzene, toluene, xylene, ligroin, chlorobenzene, trichloro ethylene, dimethyl ether, dioxane, acetone and diethyl ketone.

7. Process of claim 1, wherein the hydrogen halide is used in gaseous form.

8. Process of claim 1, wherein the hydrogen halide is used in the form of a solution in an inert organic solvent.

9. Process of claim 1, wherein the alkali metal cyanate is used in at least equivalent amounts with respect to the hydrogen halide.

10. Process of claim 1, wherein the reaction is carried out at a temperature of 20–100° C.

References Cited

UNITED STATES PATENTS 3,314,754   4/1967   Godfrey _____ 23—151

FOREIGN PATENTS 1,328,696   4/1963   France.

EDWARD J. MEROS, *Primary Examiner.*

OSCAR R. VERTIZ, *Examiner.*

H. S. MILLER, *Assistant Examiner.*